(12) United States Patent
Li et al.

(10) Patent No.: US 10,382,939 B2
(45) Date of Patent: Aug. 13, 2019

(54) UE COMMUNICATION METHOD, DEVICE, AND COMMUNICATIONS SYSTEM

(71) Applicant: Huawei Technologies Co., Ltd., Shenzhen, Guangdong (CN)

(72) Inventors: Bingzhao Li, Beijing (CN); Xiaolong Guo, Beijing (CN); Yue Li, Shenzhen (CN); Fei Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/736,983

(22) Filed: Jun. 11, 2015

(65) Prior Publication Data

US 2015/0281939 A1    Oct. 1, 2015

Related U.S. Application Data

(63) Continuation of application No. PCT/CN2012/086358, filed on Dec. 11, 2012.

(51) Int. Cl.
| | |
|---|---|
| *H04W 8/00* | (2009.01) |
| *H04W 4/80* | (2018.01) |
| *H04W 68/02* | (2009.01) |
| *H04W 76/40* | (2018.01) |
| *H04W 8/18* | (2009.01) |
| *H04W 88/06* | (2009.01) |
| *H04W 88/10* | (2009.01) |
| *H04W 8/22* | (2009.01) |
| *H04W 8/26* | (2009.01) |

(52) U.S. Cl.
CPC ............. *H04W 8/005* (2013.01); *H04W 4/80* (2018.02); *H04W 8/186* (2013.01); *H04W 68/02* (2013.01); *H04W 76/40* (2018.02); *H04W 8/22* (2013.01); *H04W 8/26* (2013.01); *H04W 88/06* (2013.01); *H04W 88/10* (2013.01)

(58) Field of Classification Search
CPC ....... H04W 4/005; H04W 4/06; H04W 4/008; H04W 4/08; H04W 8/005; H04W 8/186; H04W 8/26; H04W 48/08; H04W 48/10; H04W 48/12; H04W 48/18; H04W 88/04; H04W 88/06; H04W 72/121; H04W 40/32

See application file for complete search history.

(56) References Cited

U.S. PATENT DOCUMENTS

| | | | |
|---|---|---|---|
| 2003/0110291 A1* | 6/2003 | Chen ..................... | H04W 40/32 709/244 |
| 2007/0160016 A1* | 7/2007 | Jain ..................... | H04W 52/367 370/338 |

(Continued)

FOREIGN PATENT DOCUMENTS

| | | |
|---|---|---|
| CN | 102378394 A | 3/2012 |
| CN | 102387497 A | 3/2012 |

(Continued)

*Primary Examiner* — Erica Navar

(57) ABSTRACT

A user equipment (UE) communication method, a device, and a communications system are provided. A first UE sends a notification message to a cellular network access device, wherein the notification message indicates that the first UE requests to be a beacon device. The first UE receives, from the cellular network access device, a message indicating that the first UE is the beacon device. The first UE sends detection signal, wherein the detection signal is for a second UE to detect the detection signal.

10 Claims, 6 Drawing Sheets

(56) References Cited

U.S. PATENT DOCUMENTS

| | | |
|---|---|---|
| 2008/0008106 A1 | 1/2008 | Boberg et al. |
| 2013/0046841 A1 | 2/2013 | Park et al. |
| 2013/0148607 A1* | 6/2013 | Yu .................... H04W 8/186 370/329 |
| 2013/0344903 A1 | 12/2013 | Li et al. |

FOREIGN PATENT DOCUMENTS

| | | |
|---|---|---|
| CN | 102647666 A | 8/2012 |
| WO | WO 2011/126321 A2 | 10/2011 |
| WO | WO 2012/019524 A1 | 2/2012 |
| WO | 2012/041363 A1 | 4/2012 |
| WO | WO 2012/148061 A1 | 11/2012 |

* cited by examiner

UE COMMUNICATION METHOD, DEVICE, AND COMMUNICATIONS SYSTEM

CROSS-REFERENCE TO RELATED APPLICATIONS

This application is a continuation of International Application No. PCT/CN2012/086358, filed on Dec. 11, 2012, which is hereby incorporated by reference in its entirety.

TECHNICAL FIELD

The present invention relates to communications technologies, and in particular, to a UE communication method, a device, and a communications system.

BACKGROUND

With rapid development of mobile communications technologies, mobile communications systems of multiple standards have emerged, such as a Global System for Mobile Communications (Global System for Mobile communications, GSM for short), a general packet radio service (General Packet Radio Service, GPRS for short) technology, a Wideband Code Division Multiple Access (Wideband Code Division Multiple Access, WCDMA for short), a CDMA-2000 network, a Time Division-Synchronous Code Division Multiple Access (Time Division-Synchronous Code Division Multiple Access, TD-SCDMA for short) network, and a Worldwide Interoperability for Microwave Access (Worldwide Interoperability for Microwave Access, WiMAX for short) network. In addition to voice communication services, usually these mobile communications systems also provide data communication services. Therefore, users can upload or download various data by using the data communication services provided by these mobile communications systems.

However, in all current mobile communications technologies, an operation is performed for a single user equipment (User Equipment, UE for short). Although another enhanced mobile communications technology is used to improve reliability and/or a throughput of data transmission of a user equipment, for example, coordinated multipoint (Coordinated Multipoint, CoMP for short) transmission is used to improve reliability of a cell-edge user equipment, or carrier aggregation (Carrier Aggregation, CA for short) is used to improve a throughput of a user equipment, once an environment of the user equipment deteriorates (for example, a signal between the user equipment and a base station is not strong), the throughput and/or reliability of data transmission of the user equipment will sharply decline.

SUMMARY

The present invention provides a UE communication method, a device, and a communications system that are used to solve a problem in the prior art that a throughput and/or reliability of data transmission of a user equipment is reduced because an environment of the user equipment deteriorates.

According to a first aspect, a user equipment UE communication method is provided, including:

reporting, by a UE, group communication capability information of the UE to a cellular network access device;

obtaining, by the UE, address information of the UE in a short range wireless communications network and a group identifier of the UE after the UE joins a UE group, where the group identifier is an identifier of the UE group, and each UE in the UE group joins the same short range wireless communications network;

reporting, by the UE, the group identifier of the UE to the cellular network access device, and receiving cellular network identity information allocated by the cellular network access device; and obtaining, by the UE, short range wireless communications network address information and cellular network identity information of one or more other UEs in the UE group except the UE; or reporting the short range wireless communications network address information and the cellular network identity information of the UE to a routing device in the short range wireless communications network.

In a first possible implementation manner of the first aspect, the obtaining, by the UE, short range wireless communications network address information and cellular network identity information of one or more other UEs in the UE group includes:

reporting, by the UE, the short range wireless communications network address information of the UE to the cellular network access device, and receiving the short range wireless communications network address information and the cellular network identity information of the one or more other UEs in the UE group that are sent by the cellular network access device.

With reference to the first aspect or the first possible implementation manner of the first aspect, in a second possible implementation manner of the first aspect, after the receiving cellular network identity information allocated by the cellular network access device, the method further includes:

receiving, by the UE, a first notification message sent by the cellular network access device, where the first notification message is a message indicating that the cellular network access device selects the UE as a beacon device of the UE group; and establishing, by the UE, a connection to the one or more other UEs in the UE group according to the first notification message.

With reference to the first aspect or the first possible implementation manner of the first aspect, in a third possible implementation manner of the first aspect, after the receiving cellular network identity information allocated by the cellular network access device, the method further includes:

establishing, by the UE, a connection to the one or more other UEs in the UE group except the UE, and reporting a second notification message to the cellular network access device, where the second notification message is a message indicating that the user equipment is used as a beacon device of the UE group.

With reference to the first aspect, in a fourth possible implementation manner of the first aspect, the obtaining, by the UE, short range wireless communications network address information and cellular network identity information of one or more other UEs in the UE group includes:

reporting, by the UE, an address of a selected port of the UE to the cellular network access device; and receiving the short range wireless communications network address information and the cellular network identity information of the one or more other UEs in the UE group that are reported by the one or more other UEs according to the address of the selected port.

With reference to the fourth possible implementation manner of the first aspect, in a fifth possible implementation manner of the first aspect, after the obtaining, by the UE, short range wireless communications network address information and cellular network identity information of one or more other UEs in the UE group except the UE, the method further includes:

separately sending, by the UE, short range wireless communications network address information and cellular network identity information of each UE in the UE group to the one or more other UEs in the UE group.

According to a second aspect, a user equipment UE communication method is provided, including:

receiving, by a cellular network access device, group communication capability information and a group identifier of each UE in a UE group that are reported by each UE, where the group identifier is an identifier of the UE group; and allocating, by the cellular network access device, cellular network identity information to each UE.

In a first possible implementation manner of the second aspect, the method further includes:

selecting, by the cellular network access device, one UE from the UE group as a beacon device, and sending a first notification message to the beacon device; and receiving, by the cellular network access device, detection information of the beacon device, or detection information and connection information that are of the beacon device, and sending the detection information, or the detection information and the connection information to one or more other UEs in the UE group except the beacon device, so that the one or more other UEs establish a connection to the beacon device.

With reference to the second aspect, in a second possible implementation manner of the second aspect, after the receiving, by a cellular network access device, group communication capability information of each UE in a UE group that is reported by each UE, the method further includes:

receiving, by the cellular network access device, a second notification message sent by one UE in the UE group, where the one UE is a beacon device of the UE group, receiving detection information of the beacon device, or detection information and connection information that are of the beacon device, and sending the detection information, or the detection information and the connection information to one or more other UEs in the UE group except the beacon device, so that the one or more other UEs establish a connection to the beacon device.

With reference to the second aspect, in a third possible implementation manner of the second aspect, after the receiving, by a cellular network access device, group communication capability information of each UE in a UE group that is reported by each UE, the method further includes:

receiving, by the cellular network access device, detection information of a beacon device of the UE group, or detection information and connection information that are of a beacon device of the UE group, and sending the detection information, or the detection information and the connection information to each UE in the UE group, so that each UE establishes a connection to the beacon device.

With reference to the second aspect, in a fourth possible implementation manner of the second aspect, after the allocating, by the cellular network access device, cellular network identity information to each UE, the method further includes:

receiving, by the cellular network access device, short range wireless communications network address information and the cellular network identity information that are reported by each UE in the UE group, and sending the short range wireless communications network address information and the cellular network identity information, which are reported by each UE in the UE group, to each UE in the UE group, or one UE in the UE group, or a routing device of the UE group, or a beacon device of the UE group.

According to a third aspect, a user equipment is provided, including:

a transceiving module, connected to a cellular network access device and configured to report group communication capability information of the UE to the cellular network access device; and an obtaining module, configured to obtain short range wireless communications network address information and a group identifier of the user equipment after a user equipment UE group is joined, where the group identifier is an identifier of the UE group, and each UE in the UE group joins the same short range wireless communications network, where:

the transceiving module is further configured to report the group identifier of the user equipment to the cellular network access device, and receive cellular network identity information allocated by the cellular network access device; and the obtaining module is further configured to obtain short range wireless communications network address information and cellular network identity information of one or more other UEs in the UE group, or the transceiving module is further configured to report the short range wireless communications network address information of the UE to a routing device in the short range wireless communications network.

In a first possible implementation manner of the third aspect, the transceiving module is further configured to report the short range wireless communications network address information of the user equipment to the cellular network access device, and receive the short range wireless communications network address information and the cellular network identity information of the one or more other UEs in the UE group that are sent by the cellular network access device.

With reference to the third aspect or the first possible implementation manner of the third aspect, in a second possible implementation manner of the third aspect, the transceiving module is further configured to receive a first notification message sent by the cellular network access device, where the first notification message is a message indicating that the cellular network access device selects the UE as a beacon device of the UE group; and the transceiving module is further configured to establish a connection to the one or more other UEs in the UE group.

With reference to the third aspect or the first possible implementation manner of the third aspect, in a third possible implementation manner of the third aspect, the transceiving module is further configured to report a second notification message to the cellular network access device, where the second notification message is a message indicating that the user equipment is used as a beacon device of the UE group; and the transceiving module is further configured to establish a connection to the one or more other UEs in the UE group.

With reference to the third aspect, in a fourth possible implementation manner of the third aspect, the transceiving module is further configured to: report an address of a selected port of the user equipment to the cellular network access device; and receive the short range wireless communications network address information and the cellular network identity information of the one or more other UEs in the UE group that are reported by the one or more other UEs according to the address of the selected port.

With reference to the fourth possible implementation manner of the third aspect, in a fifth possible implementation manner of the third aspect, the transceiving module is further configured to separately send short range wireless communications network address information and cellular network identity information of each UE in the UE group to the one or more other UEs in the UE group.

According to a fourth aspect, a cellular network access device is provided, including:

a transceiving module, separately connected to each UE in a user equipment UE group and configured to receive group communication capability information and a group identifier of each UE that are reported by each UE, where the group identifier is an identifier of the UE group; and an allocating module, configured to allocate cellular network identity information to each UE.

In a first possible implementation manner of the fourth aspect, the cellular network access device further includes:

a selecting module, configured to select one UE from the UE group as a beacon device, and send a first notification message to the beacon device, where the transceiving module is further configured to receive detection information of the beacon device, or detection information and connection information that are of the beacon device, and send the detection information, or the detection information and the connection information to one or more other UEs in the UE group except the beacon device, so that the one or more other UEs establish a connection to the beacon device.

With reference to the fourth aspect, in a second possible implementation manner of the fourth aspect, the transceiving module is further configured to receive a second notification message sent by one UE in the UE group, where the one UE is a beacon device of the UE group, receive detection information of the beacon device, or detection information and connection information that are of the beacon device, and send the detection information, or the detection information and the connection information to one or more other UEs in the UE group except the beacon device, so that the one or more other UEs establish a connection to the beacon device.

With reference to the fourth aspect, in a third possible implementation manner of the fourth aspect, the transceiving module is further configured to receive detection information of a beacon device of the UE group, or detection information and connection information that are of a beacon device of the UE group, and send the detection information, or the detection information and the connection information to each UE in the UE group, so that each UE establishes a connection to the beacon device.

With reference to the fourth aspect, in a fourth possible implementation manner of the fourth aspect, the transceiving module is further configured to receive short range wireless communications network address information and cellular network identity information that are reported by each UE in the UE group, and send the short range wireless communications network address information and the cellular network identity information, which are reported by each UE in the UE group, to each UE in the UE group, or one UE in the UE group, or a routing device of the UE group, or a beacon device of the UE group.

According to a fifth aspect, a communications system is provided, including: a user equipment UE group and a cellular network access device, where the UE group includes multiple UEs, where:

each UE is connected to the cellular network access device; and is configured to: obtain short range wireless communications network address information and a group identifier of the UE after joining the same short range wireless communications network, and report group communication capability information and the group identifier of the UE to the cellular network access device;

the cellular network access device is separately connected to each UE; and is configured to: allocate cellular network identity information to each UE, and receive the group communication capability information and the group identifier of each UE; and in the UE group, one UE obtains short range wireless communications network address information and cellular network identity information of one or more other UEs in the UE group, or each UE obtains short range wireless communications network address information and cellular network identity information of one or more other UEs in the UE group.

In a first possible implementation manner of the fifth aspect, the cellular network access device is further configured to select one UE from the UE group as a beacon device, send a notification message to the beacon device, and send obtained detection information of the beacon device, or detection information and connection information that are of the beacon device to one or more other UEs in the UE group except the beacon device; and the one or more other UEs in the UE group except the beacon device are configured to establish a connection to the beacon device according to the detection information of the beacon device, or the detection information and the connection information, so that each UE joins the same short range wireless communications network.

With reference to the fifth aspect, in a second possible implementation manner of the fifth aspect, the cellular network access device is further configured to use one UE in the UE group as a beacon device according to a received notification message sent by the one UE, and send obtained detection information of the beacon device, or detection information and connection information that are of the beacon device to one or more other UEs in the UE group except the beacon device; and the one or more other UEs in the UE group except the beacon device are configured to establish a connection to the beacon device according to the detection information of the beacon device, or the detection information and the connection information, so that each UE joins the same short range wireless communications network.

With reference to the fifth aspect, in a third possible implementation manner of the fifth aspect, the communications system further includes: a beacon device, where:

the cellular network access device is further configured to obtain detection information of the beacon device, or detection information and connection information that are of the beacon device, and send the detection information of the beacon device, or the detection information and the connection information to the UEs in the UE group; and each of the UEs in the UE group is further configured to establish a connection to the beacon device according to the detection information of the beacon device, or the detection information and the connection information, so that each UE joins the same short range wireless communications network.

With reference to the fifth aspect, the first possible implementation manner of the fifth aspect, the second possible implementation manner of the fifth aspect, or the third possible implementation manner of the fifth aspect, in a fourth possible implementation manner of the fifth aspect, each UE is further configured to report the short range wireless communications network address information of the UE to the cellular network access device; and that one UE or each UE in the UE group is configured to obtain short range wireless communications network address information and cellular network identity information of one or more other UEs in the UE group is specifically:

the one UE or each UE in the UE group is configured to receive and save the short range wireless communications network address information and the cellular network identity information of the one or more other UEs in the UE group that are sent by the cellular network access device.

With reference to the fifth aspect, the first possible implementation manner of the fifth aspect, the second possible implementation manner of the fifth aspect, or the third possible implementation manner of the fifth aspect, in a fifth possible implementation manner of the fifth aspect, one UE in the UE group is configured to report an address of a selected port of the one UE to the cellular network access device;

the cellular network access device is further configured to send the received address of the selected port to one or more other UEs in the UE group except the one UE; and the one UE is further configured to receive short range wireless communications network address information and cellular network identity information of the one or more other UEs that are reported by the one or more other UEs according to the address of the selected port.

With reference to the fifth possible implementation manner of the fifth aspect, in a sixth possible implementation manner of the fifth aspect, the one UE is further configured to separately send the short range wireless communications network address information and the cellular network identity information of each UE in the UE group to the one or more other UEs.

According to a sixth aspect, a communications system is provided, including: a user equipment UE group, a cellular network access device, and a routing device, where the UE group includes multiple UEs, where:

each UE is connected to the cellular network access device; and is configured to: obtain short range wireless communications network address information and a group identifier of the UE after joining the same short range wireless communications network, and report group communication capability information and the group identifier of the UE to the cellular network access device;

the cellular network access device is separately connected to each UE; and is configured to: allocate cellular network identity information to each UE, and receive the group communication capability information and the group identifier of each UE; and the routing device is configured to obtain the short range wireless communications network address information and the cellular network identity information of each UE in the UE group.

In a first possible implementation manner of the sixth aspect, the cellular network access device is further configured to select one UE from the UE group as a beacon device, send a notification message to the beacon device, and send obtained detection information of the beacon device, or detection information and connection information that are of the beacon device to one or more other UEs in the UE group except the beacon device; and the one or more other UEs in the UE group except the beacon device are configured to establish a connection to the beacon device according to the detection information of the beacon device, or the detection information and the connection information, so that each UE joins the same short range wireless communications network.

With reference to the sixth aspect, in a second possible implementation manner of the sixth aspect, the cellular network access device is further configured to use one UE in the UE group as a beacon device according to a received notification message sent by the one UE, and send obtained detection information of the beacon device, or detection information and connection information that are of the beacon device to one or more other UEs in the UE group except the beacon device; and the one or more other UEs in the UE group except the beacon device are configured to establish a connection to the beacon device according to the detection information of the beacon device, or the detection information and the connection information, so that each UE joins the same short range wireless communications network.

With reference to the sixth aspect, in a third possible implementation manner of the sixth aspect, the communications system further includes: a beacon device, where:

the cellular network access device is further configured to obtain detection information of the beacon device, or detection information and connection information that are of the beacon device, and send the detection information of the beacon device, or the detection information and the connection information to the UEs in the UE group; and each of the UEs in the UE group is further configured to establish a connection to the beacon device according to the detection information of the beacon device, or the detection information and the connection information, so that each UE joins the same short range wireless communications network.

With reference to the sixth aspect, in a fourth possible implementation manner of the sixth aspect, the cellular network access device is further configured to obtain detection information of the routing device, or detection information and connection information that are of the routing device, and send the detection information of the routing device, or the detection information and the connection information to the UEs in the UE group; and each of the UEs in the UE group is further configured to establish a connection to the routing device according to the detection information of the routing device, or the detection information and the connection information, so that each UE joins the same short range wireless communications network.

A technical effect of the present invention is as follows: multiple UEs in a UE group are all made to join the same short range wireless communications network, and each UE is connected to a cellular network access device, so that each UE separately obtains cellular network identity information allocated by the cellular network access device, and then reports group communication capability information and a group identifier of the UE to the cellular network access device, so that the cellular network access device receives the group communication capability information and the group identifier of each UE; and finally, one UE or each UE in the UE group obtains short range wireless communications network address information and cellular network identity information of one or more other UEs in the UE group, or a routing device obtains short range wireless communications network address information and the cellular network identity information of each UE in the UE group. This implements interaction between the UEs, and improves a throughput and/or reliability of data transmission of the UE.

DETAILED DESCRIPTION

Figure 1:
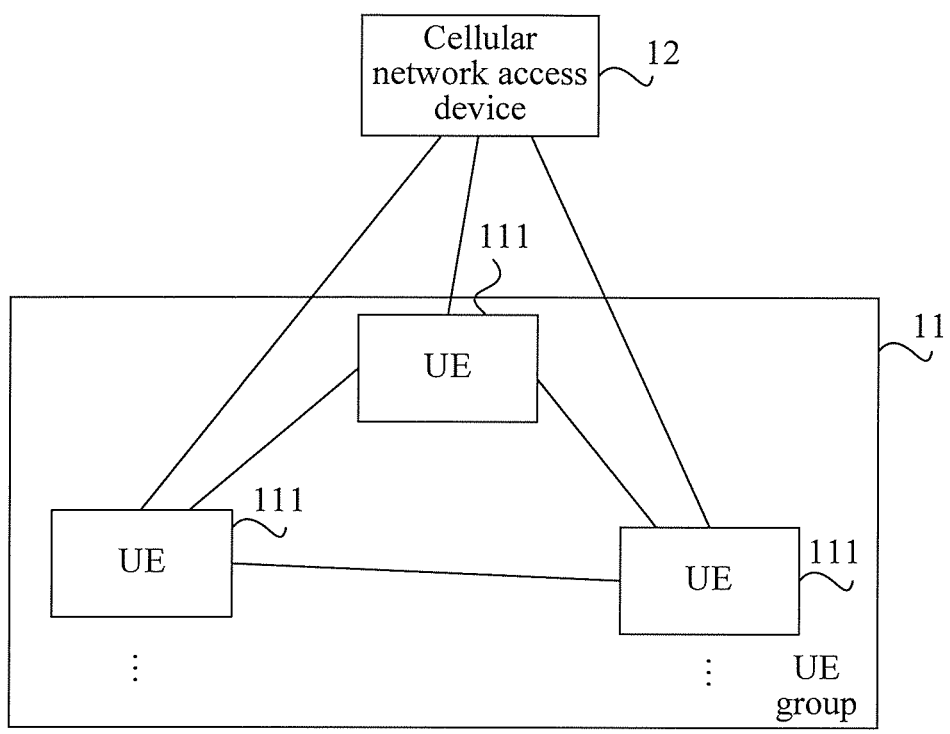
FIG. 1 is a communications system for implementing a UE communication method according to the present invention.

FIG. 1 shows a communications system for implementing a UE communication method according to the present invention. The communications system includes: a UE group 11 and a cellular network access device 12, where the UE group 11 includes multiple UEs 111, where each UE 111 is connected to the cellular network access device 12.

Figure 2:
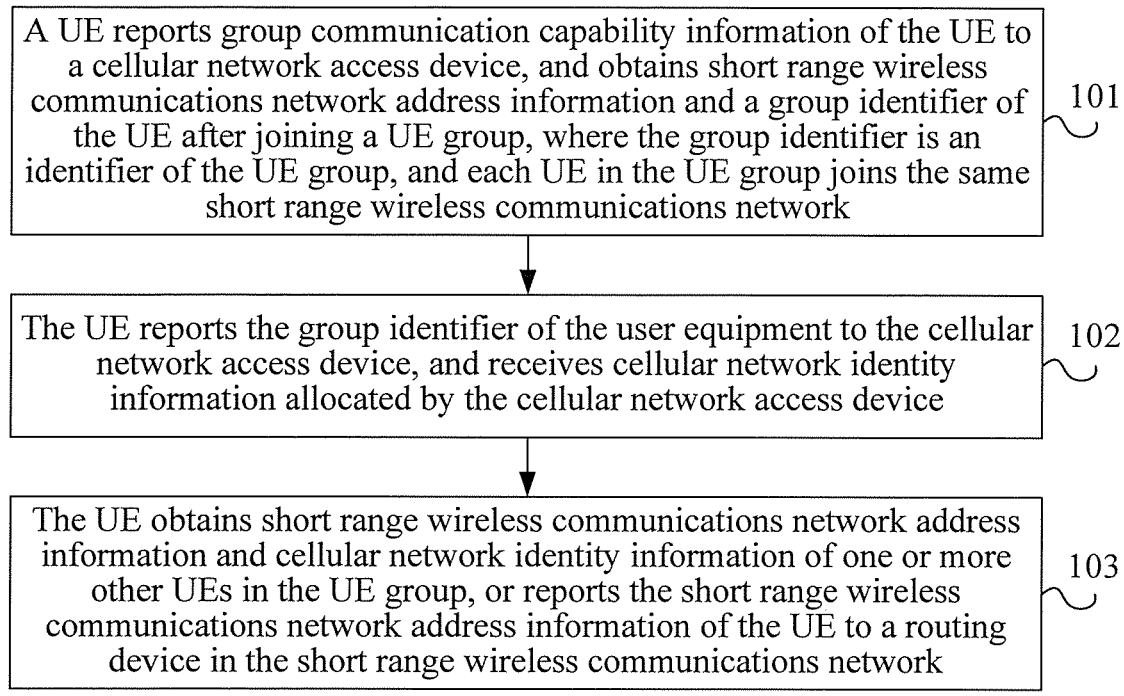
FIG. 2 is a flowchart of an embodiment of a UE communication method according to the present invention.

FIG. 2 is a flowchart of an embodiment of a UE communication method according to the present invention. With reference to the communications system in the embodiment shown in FIG. 1, as shown in FIG. 2, the method includes:

Step 101: A UE reports group communication capability information of the UE to a cellular network access device, and obtains short range wireless communications network address information and a group identifier of the UE after joining a UE group, where the group identifier is an identifier of the UE group, and each UE in the UE group joins the same short range wireless communications network.

In this embodiment, the group communication capability information indicates whether the UE has a group communication capability, where the group communication capability refers to a capability using which the UE can form a UE group with one or more other UEs by using a short range wireless communications network. After a UE reports the group communication capability information of the UE to the cellular network access device, the cellular network access device may notify the UE, which has the group communication capability, of a server in the short range wireless communications network, so that the UE is connected to the short range wireless communications network by using the server in the short range wireless communications network, and joins a UE group.

In addition, in this embodiment, the UE is connected to the short range wireless communications network by using the server in the short range wireless communications network, and joins a UE group; the server in the short range wireless communications network then allocates short range wireless communications network address information and a group identifier to the UE. The server in the short range wireless communications network may be a beacon device or a routing device; when the server in the short range wireless communications network is a beacon device, the beacon device may be a UE in the UE group, and may also be a device in the short range wireless communications network, such as a router or a WiFi server. The group identifier may be identity information of the server in the short range wireless communications network, for example, identity information of the beacon device of the UE group or identity information of the routing device of the UE group. In addition, a device that satisfies detectability and connectivity may be referred to as a beacon device. Specifically, detectability indicates that a UE can find the beacon device by search, and connectivity indicates that a UE can establish a connection to the beacon device, so as to confirm that the UE joins the short range wireless communications network.

Step 102: The UE reports the group identifier of the user equipment to the cellular network access device, and receives cellular network identity information allocated by the cellular network access device.

In this embodiment, the cellular network access device may specifically be a base station or the like. It should be noted that the base station herein may be a base station in a broad sense, for example, a radio network controller (Radio Network Controller, RNC for short) in a 3G network, or an evolved base station in a 4G network, or a base station controller in a 2G network. For any two UEs in the UE group, a connection between the UEs may be established in a short range wireless communications manner (for example, WiFi or Bluetooth). The short range wireless communications network address information is Media Access Control (Media Access Control, MAC for short) address information or Internet Protocol (Internet Protocol, IP for short) address information. The cellular network identity information may be a radio network temporary identifier (Radio Network Temporary Identifier, RNTI for short), or a logical channel identifier, or an RNTI and a logical channel identifier, or inner-group identity information allocated for group communication, or inner-group identity information and a logical channel identifier. It should be noted that the inner-group identity information is a piece of identity information of the UE in the UE group, and the group identifier refers to an identifier of the UE group to which the UE belongs.

Step 103: The UE obtains short range wireless communications network address information and cellular network identity information of one or more other UEs in the UE group, or reports the short range wireless communications network address information of the UE to a routing device in the short range wireless communications network.

In this embodiment, one UE or each UE in the UE group obtains short range wireless communications network address information and cellular network identity information of one or more other UEs in the UE group, or the routing device in the short range wireless communications network obtains short range wireless communications network address information and cellular network identity information of each UE in the UE group. Therefore, for example, when the cellular network access device needs to send data to a UE in the UE group, the cellular network access device may directly send the data to the UE, or one or more other UEs in the UE group may be used to forward the data to the UE according to short range wireless communications network address information and cellular network identity information of one or more other UEs in the UE group that are stored in advance, or the routing device in the short range wireless communications network is used to forward the data to the UE according to the short range wireless communications network address information and the cellular network identity information of each UE in the UE group that are stored in advance. Especially when an environment of the UE deteriorates, and the UE cannot directly receive the data sent by the cellular network access device, one or more other UEs in the UE group or the routing device in the short range wireless communications network may be used to forward the data to the UE.

In this embodiment, after a UE joins a UE group, short range wireless communications network address information and a group identifier of the UE is obtained; group communication capability information and the group identifier of the UE are reported to a cellular network access device; cellular network identity information allocated by the cellular network access device is received; and then short range wireless communications network address information and cellular network identity information of one or more other UEs in the UE group are obtained, or the short range wireless communications network address information of the UE is reported to a routing device in a short range wireless communications network, so that the routing device in the short range wireless communications network stores short range wireless communications network address information and cellular network identity information of each UE in the UE group. In this way, when an environment of a UE in the UE group deteriorates, and the UE cannot directly receive data sent by the cellular network access device, one or more other UEs in the UE group or the routing device in the short range wireless communications network may be used to forward the data to the UE according to the short range wireless communications network address information and the cellular network identity information of each UE in the UE group that are stored in advance, thereby implementing interaction between the UEs, and improving a throughput and/or reliability of data transmission of the UE.

Preferably, in the foregoing embodiment shown in FIG. 2, the obtaining, by a UE, short range wireless communications network address information and a group identifier of the UE in step 101 may mainly be implemented in the following several manners:

First manner: A user of the UE may perform a manual operation to connect to the server in the short range wireless communications network so as to access the short range wireless communications network; after the access to the short range wireless communications network, the server in the short range wireless communications network allocates the corresponding short range wireless communications network address information and the corresponding group identifier to the UE.

Second manner: The UE finds the server in the short range wireless communications network by means of frequency scanning, and is connected to the server in the short range wireless communications network so as to access the short range wireless communications network; finally, after the access to the short range wireless communications network, the server in the short range wireless communications network allocates the corresponding short range wireless communications network address information and the corresponding group identifier to the UE.

Third manner: An example is used in which the server in the short range wireless communications network is a beacon device, and the beacon device is a UE in the UE group. The cellular network access device is further configured to select one or more other UEs from the UE group as a beacon device, send a notification message to the beacon device, and then send obtained detection information of the beacon device, or detection information and connection information that are of the beacon device to one or more other UEs in the UE group except the beacon device. The one or more other UEs in the UE group except the beacon device are configured to establish a connection to the beacon device according to the detection information of the beacon device, or the detection information and the connection information, so as to access the short range wireless communications network.

In the third implementation manner, after establishing the connection to the beacon device, the one or more other UEs can receive short range wireless communications network address information and a group identifier of the one or more other UEs that are allocated by the beacon device. The beacon device may be specified by the cellular network access device; preferably, the cellular network access device may select one UE as the beacon device according to factors such as a capability of a UE in the UE group and a location of a UE in the UE group, and instructs the UE to perform a beacon function. In addition, the beacon device or a UE that is in the short range wireless communications network and is connected to the beacon device reports the detection information of the beacon device, or the detection information and the connection information to the cellular network access device. The detection information includes: an identifier of the beacon device, or may also include: an identifier of the beacon device, a transmit frequency of the beacon device, a pilot frequency of the beacon device, and the like. The connection information includes: security information, address information of the beacon device, and the like. In addition, it should also be noted that in this manner, the UE group identifier may be identity information of the beacon device.

Fourth manner: An example is used in which the server in the short range wireless communications network is a beacon device, and the beacon device is a UE in the UE group. The cellular network access device is further configured to use one UE in the UE group as a beacon device according to a received notification message sent by the one UE, and send obtained detection information of the beacon device, or detection information and connection information that are of the beacon device to one or more other UEs in the UE group except the beacon device. The one or more other UEs in the UE group except the beacon device are configured to establish a connection to the beacon device according to the detection information of the beacon device, or the detection information and the connection information.

In the fourth implementation manner, after establishing the connection to the beacon device, the one or more other UEs in the UE group can receive short range wireless communications network address information and a group identifier of the one or more other UEs that are allocated by the beacon device, where the beacon device is the one UE in the UE group. In addition, preferably, the beacon device or a UE that is in the short range wireless communications network and is connected to the beacon device reports the detection information of the beacon device, or the detection information and the connection information to the cellular network access device. The detection information includes: an identifier of the beacon device, or may also include: an identifier of the beacon device, a transmit frequency of the beacon device, a pilot frequency of the beacon device, and the like. The connection information includes: security information, address information of the beacon device, and the like. In addition, it should also be noted that in this manner, the UE group identifier may be identity information of the beacon device.

Fifth manner: An example is used in which the server in the short range wireless communications network is a beacon device, and the beacon device is a device in the short range wireless communications network and is not any UE in the UE group. For example, the beacon device may be a router or a WiFi server. Specifically, the cellular network access device is further configured to obtain detection information of the beacon device, or detection information and connection information that are of the beacon device, and send the detection information of the beacon device, or the detection information and the connection information to the UEs in the UE group. Each of the UEs in the UE group is further configured to establish a connection to the beacon device according to the detection information of the beacon device, or the detection information and the connection information.

In the fifth implementation manner, after establishing the connection to the beacon device, the UEs in the UE group can obtain short range wireless communications network address information and group identifiers of the UEs. Preferably, a UE that is in the short range wireless communications network and is connected to the beacon device reports the detection information of the beacon device, or the detection information and the connection information to the cellular network access device. The detection information includes: an identifier of the beacon device, or may also include: an identifier of the beacon device, a transmit frequency of the beacon device, a pilot frequency of the beacon device, and the like. The connection information includes: security information, address information of the beacon device, and the like. In addition, it should also be noted that in this manner, information about the UE group identifier may be identity information of the beacon device.

Further, in another embodiment of the present invention, based on the foregoing embodiment shown in FIG. 2, a specific implementation manner of the obtaining, by the UE, short range wireless communications network address information and cellular network identity information of one or more other UEs in the UE group in step 103 is:

reporting, by the UE, the short range wireless communications network address information of the UE to the cellular network access device, and receiving the short range wireless communications network address information and the cellular network identity information of the one or more other UEs in the UE group that are sent by the cellular network access device.

Preferably, the method further includes:

receiving, by the UE, a first notification message sent by the cellular network access device, where the first notification message is a message indicating that the cellular network access device selects the UE as a beacon device of the UE group; and establishing, by the UE, a connection to the one or more other UEs in the UE group according to the first notification message.

Alternatively, the method further includes:

establishing, by the UE, a connection to the one or more other UEs in the UE group, and reporting a second notification message to the cellular network access device, where the second notification message is a message indicating that the user equipment is used as a beacon device of the UE group.

Further, in still another embodiment of the present invention, based on the foregoing embodiment shown in FIG. 2, another specific implementation manner of the obtaining, by the UE, short range wireless communications network address information and cellular network identity information of one or more other UEs in the UE group in step 103 is:

reporting, by the UE, an address of a selected port of the UE to the cellular network access device; and receiving the short range wireless communications network address information and the cellular network identity information of the one or more other UEs in the UE group that are reported by the one or more other UEs according to the address of the selected port.

Preferably, the method further includes: separately sending, by the UE, short range wireless communications network address information and cellular network identity information of each UE in the UE group to the one or more other UEs in the UE group.

Figure 3:
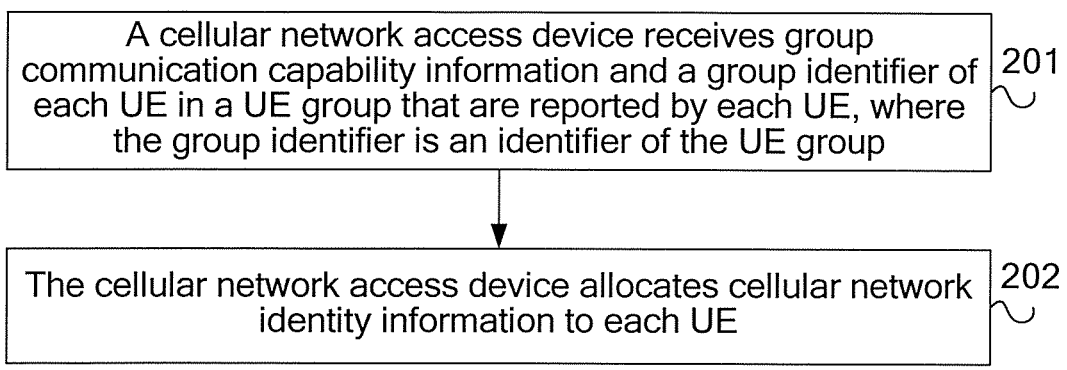
FIG. 3 is a flowchart of another embodiment of a UE communication method according to the present invention.

FIG. 3 is a flowchart of another embodiment of a UE communication method according to the present invention. With reference to the communications system in the embodiment shown in FIG. 1, as shown in FIG. 3, the method includes:

Step 201: A cellular network access device receives group communication capability information and a group identifier of each UE in a UE group that are reported by each UE, where the group identifier is an identifier of the UE group.

In this embodiment, each UE in the UE group can implement the basic solution in the foregoing method embodiment shown in FIG. 2, where implementation principles thereof are similar, and details are not described herein again.

Step 202: The cellular network access device allocates cellular network identity information to each UE.

Further, in yet another embodiment of the present invention, based on the foregoing embodiment shown in FIG. 3, the method further includes:

selecting, by the cellular network access device, one UE from the UE group as a beacon device, and sending a first notification message to the beacon device; and receiving, by the cellular network access device, detection information of the beacon device, or detection information and connection information that are of the beacon device, and sending the detection information, or the detection information and the connection information to one or more other UEs in the UE group except the beacon device, so that the one or more other UEs establish a connection to the beacon device.

Still further, in another embodiment of the present invention, based on the foregoing embodiment shown in FIG. 3, the method further includes:

receiving, by the cellular network access device, a second notification message sent by one UE in the UE group, where the one UE is a beacon device of the UE group, receiving detection information of the beacon device, or detection information and connection information that are of the beacon device, and sending the detection information, or the detection information and the connection information to one or more other UEs in the UE group except the beacon device, so that the one or more other UEs establish a connection to the beacon device.

Still further, in still another embodiment of the present invention, based on the foregoing embodiment shown in FIG. 3, the method further includes:

receiving, by the cellular network access device, detection information of a beacon device of the UE group, or detection information and connection information of a beacon device of the UE group, and sending the detection information, or the detection information and the connection information to each UE in the UE group, so that each UE establishes a connection to the beacon device.

Still further, in yet another embodiment of the present invention, based on the foregoing embodiment shown in FIG. 3, the method further includes:

receiving, by the cellular network access device, short range wireless communications network address information and the cellular network identity information that are reported by each UE in the UE group, and sending the short range wireless communications network address information and the cellular network identity information, which are reported by each UE in the UE group, to each UE in the UE group, or one UE in the UE group, or a routing device of the UE group, or a beacon device of the UE group.

Figure 4:
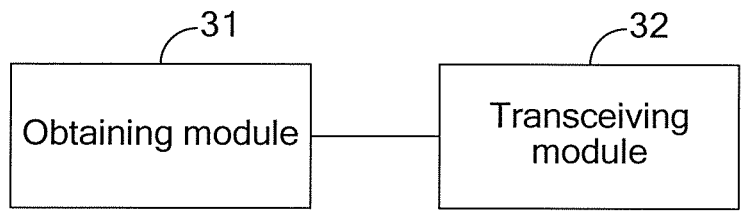
FIG. 4 is a schematic structural diagram of an embodiment of a user equipment according to the present invention.

FIG. 4 is a schematic structural diagram of an embodiment of a user equipment according to the present invention. As shown in FIG. 4, the user equipment in this embodiment includes: an obtaining module 31 and a transceiving module 32. The transceiving module 32 is configured to be connected to a cellular network access device, and is configured to report group communication capability information of the UE to the cellular network access device. The obtaining module 31 is configured to obtain short range wireless communications network address information and a group identifier of the user equipment after a UE group is joined, where each UE in the UE group joins the same short range wireless communications network. The transceiving module 32 is further configured to report the group identifier of the user equipment to the cellular network access device, and receive cellular network identity information allocated by the cellular network access device. The obtaining module 31 is further configured to obtain short range wireless communications network address information and cellular network identity information of one or more other UEs in the UE group, or the transceiving module 32 is further configured to report the short range wireless communications network address information of the UE to a routing device in the short range wireless communications network, so that the routing device in the short range wireless communications network stores short range wireless communications network address information and cellular network identity information of each UE in the UE group.

The user equipment in this embodiment can execute the technical solution in the method embodiment shown in FIG. 2, where implementation principles thereof are similar, and details are not described herein again.

In this embodiment, after a UE joins a UE group, short range wireless communications network address information and a group identifier of the UE is obtained; group communication capability information and the group identifier of the UE are reported to a cellular network access device; cellular network identity information allocated by the cellular network access device is received; and then short range wireless communications network address information and cellular network identity information of one or more other UEs in the UE group are obtained, or the short range wireless communications network address information of the UE is reported to a routing device in the short range wireless communications network, so that the routing device in the short range wireless communications network stores short range wireless communications network address information and cellular network identity information of each UE in the UE group. In this way, when an environment of a UE in the UE group deteriorates, and the UE cannot directly receive data sent by the cellular network access device, one or more other UEs in the UE group or the routing device in the short range wireless communications network may be used to forward the data to the UE according to the short range wireless communications network address information and the cellular network identity information of each UE in the UE group that are stored in advance, thereby implementing interaction between the UEs, and improving a throughput and/or reliability of data transmission of the UE.

Further, in another embodiment of the user equipment of the present invention, based on the foregoing embodiment shown in FIG. 4, the transceiving module 32 is further configured to report the short range wireless communications network address information of the user equipment to the cellular network access device, and receive the short range wireless communications network address information and the cellular network identity information of the one or more other UEs in the UE group that are sent by the cellular network access device.

Preferably, the transceiving module 32 is further configured to receive a first notification message sent by the cellular network access device, where the first notification message is a message indicating that the cellular network access device selects the user equipment as a beacon device of the UE group; and the transceiving module 32 is further configured to establish a connection to the one or more other UEs in the UE group.

Alternatively, the transceiving module 32 is further configured to report a second notification message to the cellular network access device, where the second notification message is a message indicating that the user equipment is used as a beacon device of the UE group; and the transceiving module 32 is further configured to establish a connection to the one or more other UEs in the UE group.

In this embodiment, the user equipment is used as a beacon device of the UE group, and the one or more other UEs in the UE group can join the same short range wireless communications network by connecting to the beacon device.

Further, in still another embodiment of the present invention, based on the foregoing embodiment shown in FIG. 4, the transceiving module 32 is further configured to: report an address of a selected port of the user equipment to the cellular network access device; and receive the short range wireless communications network address information and the cellular network identity information of the one or more other UEs in the UE group that are reported by the one or more other UEs according to the address of the selected port.

Preferably, the transceiving module 32 is further configured to separately send the short range wireless communications network address information and the cellular network identity information of each UE in the UE group to the one or more other UEs in the UE group.

In this embodiment, when a routing manner of the short range wireless communications network that the user equipment joins is a centralized routing manner, and the user equipment is a routing device of the UE group, the transceiving module 32 is further configured to: report the address of the selected port of the user equipment to the cellular network access device, and receive the short range wireless communications network address information and the cellular network identity information of the one or more other UEs in the UE group that are reported by the one or more other UEs according to the address of the selected port. When the routing manner of the short range wireless communications network that the user equipment joins is a distributed routing manner, the transceiving module 32 is further configured to: report the address of the selected port of the user equipment to the cellular network access device, receive the short range wireless communications network address information and the cellular network identity information of the one or more other UEs in the UE group that are reported by the one or more other UEs according to the address of the selected port, and finally separately send the short range wireless communications network address information and the cellular network identity information of each UE in the UE group to the one or more other UEs in the UE group.

Figure 5:
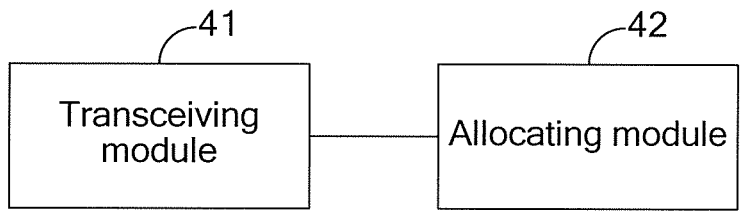
FIG. 5 is a schematic structural diagram of an embodiment of a cellular network access device according to the present invention.

FIG. 5 is a schematic structural diagram of an embodiment of a cellular network access device according to the present invention. As shown in FIG. 5, the cellular network access device in this embodiment includes: a transceiving module 41 and an allocating module 42. The transceiving module 41 is separately connected to each UE in a UE group and is configured to receive group communication capability information and a group identifier of each UE that are reported by each UE, where the group identifier is an identifier of the UE group. The allocating module 42 is configured to allocate cellular network identity information to each UE.

The cellular network access device in this embodiment can execute the technical solution in the method embodiment shown in FIG. 3, where implementation principles thereof are similar, and details are not described herein again.

Figure 6:
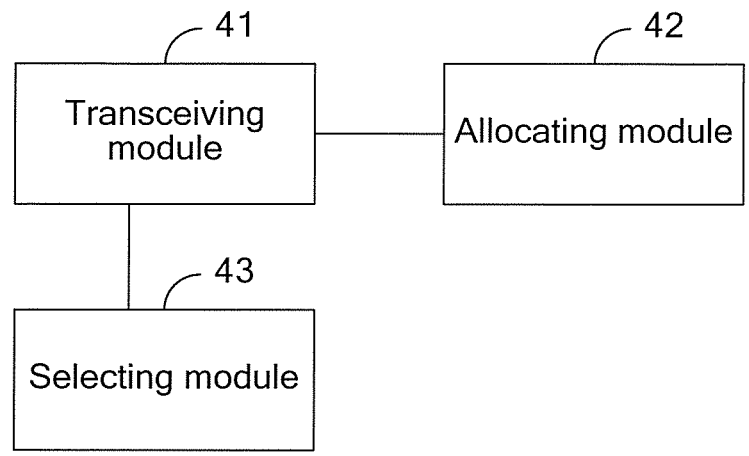
FIG. 6 is a schematic structural diagram of another embodiment of a cellular network access device according to the present invention.

Further, FIG. 6 is a schematic structural diagram of another embodiment of a cellular network access device according to the present invention. Based on the foregoing embodiment shown in FIG. 5, as shown in FIG. 6, the cellular network access device further includes: a selecting module 43, configured to select one UE from the UE group as a beacon device and send a first notification message to the beacon device.

The transceiving module 41 is further configured to receive detection information of the beacon device, or detection information and connection information that are of the beacon device, and send the detection information, or the detection information and the connection information to one or more other UEs in the UE group except the beacon device, so that the one or more other UEs establish a connection to the beacon device.

Still further, in still another embodiment of the cellular network access device of the present invention, based on the foregoing embodiment shown in FIG. 5, the transceiving module 41 is further configured to receive a second notification message sent by one UE in the UE group, where the one UE is a beacon device of the UE group, receive detection information of the beacon device, or detection information and connection information that are of the beacon device, and send the detection information, or the detection information and the connection information to one or more other UEs in the UE group except the beacon device, so that the one or more other UEs establishes a connection to the beacon device.

Still further, in yet another embodiment of the cellular network access device of the present invention, based on the foregoing embodiment shown in FIG. 5, the transceiving module 41 is further configured to receive detection information of a beacon device of the UE group, or detection information and connection information that are of a beacon device of the UE group, and send the detection information, or the detection information and the connection information to each UE in the UE group, so that each UE establishes a connection to the beacon device.

Still further, in still yet another embodiment of the cellular network access device of the present invention, based on the foregoing embodiment shown in FIG. 5, the transceiving module is further configured to receive short range wireless communications network address information and cellular network identity information that are reported by each UE in the UE group, and send the short range wireless communications network address information and the cellular network identity information, which are reported by each UE in the UE group, to each UE in the UE group, or one UE in the UE group, or a routing device of the UE group, or a beacon device of the UE group.

Figure 7:
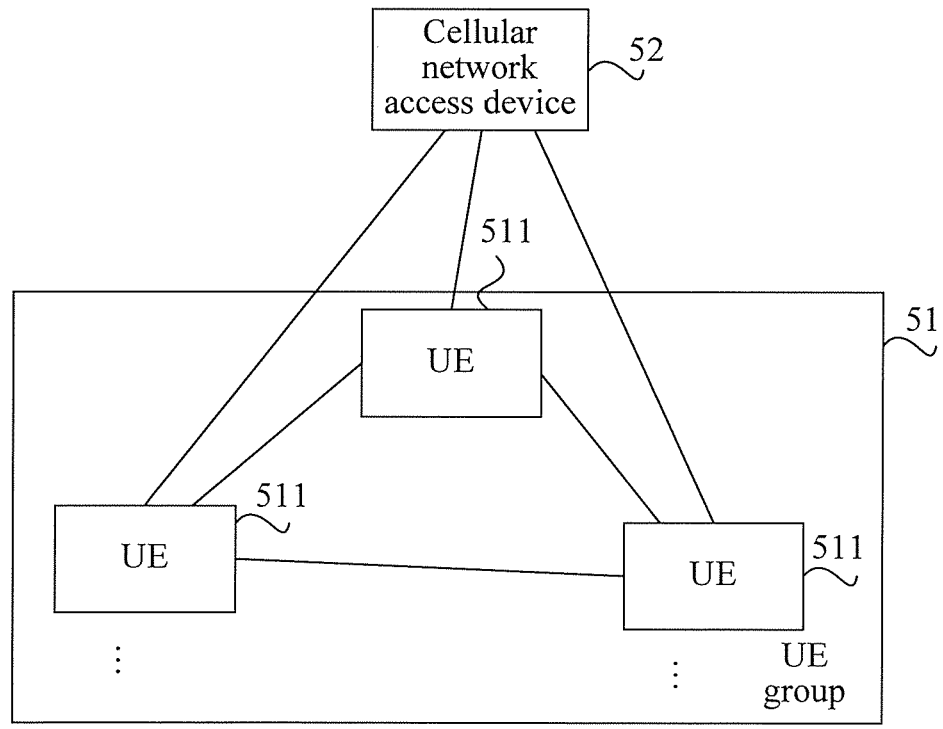
FIG. 7 is a schematic structural diagram of an embodiment of a communications system according to the present invention.

FIG. 7 is a schematic structural diagram of an embodiment of a communications system according to the present invention. As shown in FIG. 7, the communications system includes: a UE group 51 and a cellular network access device 52, where the UE group 51 includes multiple UEs 511. Each UE 511 is connected to the cellular network access device 52; and is configured to: obtain short range wireless communications network address information and a group identifier of the UE 511 after joining the same short range wireless communications network, and report group communication capability information and the group identifier of the UE 511 to the cellular network access device 52. The cellular network access device 52 is separately connected to each UE 511; and is configured to: allocate cellular network identity information to each UE 511, and receive the group communication capability information and the group identifier of each UE 511. In the UE group 51, one UE 511 may be used to obtain short range wireless communications network address information and cellular network identity information of one or more other UEs 511 in the UE group 51, or each UE 511 may be used to obtain short range wireless communications network address information and cellular network identity information of one or more other UEs 511 in the UE group 51.

In this embodiment, each UE 511 in the UE group 51 joins the same short range wireless communications network. For each UE 511, the group communication capability information indicates whether the UE 511 has a group communication capability, where the group communication capability refers to a capability using which the UE 511 can form the UE group 51 with one or more other UEs 511 by using the short range wireless communications network. The group identifier of each UE 511 may be identity information of a server in the short range wireless communications network, for example, identity information of a beacon device of the UE group 51 or identity information of a routing device of the UE group 51. The server in the short range wireless communications network may be a beacon device, a routing device, or the like. In addition, the beacon device has two basic attributes, where one is detectability and the other is connectivity. Detectability indicates that a UE can find the beacon device by search, and connectivity indicates that a UE can establish a connection to the beacon device, so as to confirm that the UE joins the short range wireless communications network. The beacon device may be a UE 511 in the UE group 51, and may also not be any UE 511 in the UE group 51, that is, the beacon device is a router, a WiFi server, or the like.

Preferably, the cellular network access device 52 may specifically be a base station or the like. It should be noted that the base station herein may be a base station in a broad sense, for example, a radio network controller (Radio Network Controller, RNC for short) in a 3G network, or an evolved base station in a 4G network, or a base station controller in a 2G network. For any two UEs 511 in the UE group 51, a connection between the UEs 511 may be established in a short range wireless communications manner (for example, WiFi or Bluetooth). The short range wireless communications network address information is Media Access Control (Media Access Control, MAC for short) address information or Internet Protocol (Internet Protocol, IP for short) address information. The cellular network identity information may be a radio network temporary identifier (Radio Network Temporary Identifier, RNTI for short), or a logical channel identifier, or an RNTI and a logical channel identifier, or inner-group identity information allocated for group communication, or inner-group identity information and a logical channel identifier. It should be noted that the inner-group identity information is a piece of identity information of the UE in the UE group, and the group identifier refers to an identifier of the UE group to which the UE belongs.

In this embodiment, the one UE 511 or each UE 511 in the UE group 51 obtains the short range wireless communications network address information and the cellular network identity information of the one or more other UEs 511 in the UE group 51. Therefore, for example, when the cellular network access device 52 needs to send data to a UE 511 in the UE group 51, the cellular network access device 52 may directly send the data to the UE 511, or one or more other UEs 511 in the UE group 51 may be used to forward the data to the UE 511. Especially when an environment of the UE 511 deteriorates, and the UE 511 cannot directly receive the data sent by the cellular network access device 52, one or more other UEs 511 in the UE group 51 may be used to forward the data to the UE 511.

In this embodiment, a UE group and a cellular network access device are provided, multiple UEs in the UE group are all made to join the same short range wireless communications network, and each UE is connected to the cellular network access device, so that each UE separately obtains cellular network identity information allocated by the cellular network access device, and then reports group communication capability information and a group identifier of the UE to the cellular network access device, so that the cellular network access device receives the group communication capability information and the group identifier of each UE; and finally, one UE or each UE in the UE group obtains short range wireless communications network address information and cellular network identity information of one or more other UEs in the UE group. In this way, when an environment of a UE in the UE group deteriorates, and the UE cannot directly receive data sent by the cellular network access device, one or more other UEs in the UE group or a routing device in the short range wireless communications network may be used to forward the data to the UE according to short range wireless communications network address information and the cellular network identity information of each UE in the UE group that are stored in advance, thereby implementing interaction between the UEs, and improving a throughput and/or reliability of data transmission of the UE.

Further, in another embodiment of the communications system of the present invention, based on the foregoing embodiment shown in FIG. 7, the obtaining, by each UE 511 in the UE group 51, short range wireless communications network address information and a group identifier of the UE 511 may mainly be implemented in the following several manners:

First manner: A user of each UE 511 may perform a manual operation to connect to the server in the short range wireless communications network so as to access the short range wireless communications network; after the access to the short range wireless communications network, the server in the short range wireless communications network allocates the corresponding short range wireless communications network address information and the corresponding group identifier to the UE 511.

Second manner: Each UE 511 finds the server in the short range wireless communications network by means of frequency scanning, and is connected to the server in the short range wireless communications network so as to access the short range wireless communications network; finally, after the access to the short range wireless communications network, the server in the short range wireless communications network allocates the corresponding short range wireless communications network address information and the corresponding group identifier to the UE 511.

Third manner: The cellular network access device 52 is further configured to select one UE 511 from the UE group 51 as a beacon device, send a notification message to the beacon device, and then send obtained detection information of the beacon device, or detection information and connection information that are of the beacon device to one or more other UEs 511 in the UE group 51 except the beacon device. The one or more other UEs 511 in the UE group except the beacon device are configured to establish a connection to the beacon device according to the detection information of the beacon device, or the detection information and the connection information.

In the third implementation manner, after establishing the connection to the beacon device, the one or more other UEs 511 can receive short range wireless communications network address information and a group identifier of the one or more other UEs 511 that are allocated by the beacon device. The beacon device may be specified by the cellular network access device 52; preferably, the cellular network access device 52 may select one UE 511 as the beacon device according to factors such as a capability of a UE 511 in the UE group 51 and a location of a UE 511 in the UE group 51, and instructs the UE 511 to perform a beacon function. In addition, the beacon device or a UE 511 that is in the short range wireless communications network and is connected to the beacon device reports the detection information of the beacon device, or the detection information and the connection information to the cellular network access device 52. The detection information includes: an identifier of the beacon device, or may also include: an identifier of the beacon device, a transmit frequency of the beacon device, a pilot frequency of the beacon device, and the like. The connection information includes: security information, address information of the beacon device, and the like. In addition, it should also be noted that in this manner, the UE group identifier may be identity information of the beacon device.

Fourth manner: The cellular network access device 52 is further configured to use one UE 511 in the UE group 51 as a beacon device according to a received notification message sent by the one UE 511, and send obtained detection information of the beacon device, or detection information and connection information that are of the beacon device to one or more other UEs 511 in the UE group 51 except the beacon device. The one or more other UEs 511 in the UE group 51 except the beacon device are configured to establish a connection to the beacon device according to the detection information of the beacon device, or the detection information and the connection information.

In the fourth implementation manner, after establishing the connection to the beacon device, the one or more other UEs 511 in the UE group 51 can receive short range wireless communications network address information and a group identifier of the one or more other UEs 511 that are allocated by the beacon device, where the beacon device is the one UE 511 in the UE group 51. In addition, preferably, the beacon device or a UE 511 that is in the short range wireless communications network and is connected to the beacon device reports the detection information of the beacon device, or the detection information and the connection information to the cellular network access device 52. The detection information includes: an identifier of the beacon device, or may also include: an identifier of the beacon device, a transmit frequency of the beacon device, a pilot frequency of the beacon device, and the like. The connection information includes: security information, address information of the beacon device, and the like. In addition, it should also be noted that in this manner, the group identifier of the UE may be identity information of the beacon device.

Fifth manner: The communications system further includes: a beacon device. For example, the beacon device may be a router or a WiFi server. Specifically, the cellular network access device 52 is further configured to obtain detection information of the beacon device, or detection information and connection information that are of the beacon device, and send the detection information of the beacon device, or the detection information and the connection information to the UEs 511 in the UE group 51. Each of the UEs 511 in the UE group 51 is further configured to establish a connection to the beacon device according to the detection information of the beacon device, or the detection information and the connection information.

In the fifth implementation manner, after establishing the connection to the beacon device, the UEs 511 in the UE group 51 can obtain short range wireless communications network address information and group identifiers of the UEs 511. Preferably, a UE 511 that is in the short range wireless communications network and is connected to the beacon device reports the detection information of the beacon device, or the detection information and the connection information to the cellular network access device 52. The detection information includes: an identifier of the beacon device, or may also include: an identifier of the beacon device, a transmit frequency of the beacon device, a pilot frequency of the beacon device, and the like. The connection information includes: security information, address information of the beacon device, and the like. In addition, it should also be noted that in this manner, information about the UE group identifier may be identity information of the beacon device.

Still further, in still another embodiment of the communications system of the present invention, based on the foregoing embodiments, each UE 511 is further configured to report the short range wireless communications network address information of the UE 511 to the cellular network access device 52; and that one UE 511 or each UE 511 in the UE group 51 is configured to obtain short range wireless communications network address information and cellular network identity information of one or more other UEs 511 in the UE group 51 is specifically:

the one UE 511 or each UE 511 in the UE group 51 is configured to receive and save the short range wireless communications network address information and the cellular network identity information of the one or more other UEs 511 in the UE group 51 that are sent by the cellular network access device 52.

In this embodiment, when a routing manner of the short range wireless communications network is a distributed routing manner, each UE 511 in the UE group 51 is configured to receive and save the short range wireless communications network address information and the cellular network identity information of the one or more other UEs 511 in the UE group 51 that are sent by the cellular network access device 52. Preferably, a routing table is saved in each UE 511, and the routing table includes the short range wireless communications network address information and the cellular network identity information of the one or more other UEs 511 in the UE group 51.

When the routing manner of the short range wireless communications network is a centralized routing manner, the one UE 511 in the UE group 51 is configured to receive and save the short range wireless communications network address information and the cellular network identity information of the one or more other UEs 511 in the UE group 51 that are sent by the cellular network access device 52. Preferably, a routing table is saved in the UE 511, and the routing table includes the short range wireless communications network address information and the cellular network identity information of the one or more other UEs 511 in the UE group 51.

It should be noted that when the routing manner of the short range wireless communications network is the centralized routing manner, the UE 511 that is in the UE group 51 and is configured to receive and save the short range wireless communications network address information and the cellular network identity information of the one or more other UEs 511 in the UE group 51 that are sent by the cellular network access device 52 may be the UE that is shown in the third manner or the fourth manner in the previous embodiment and has a beacon device function.

Still further, in yet another embodiment of the communications system of the present invention, based on the foregoing embodiment shown in FIG. 7, one UE 511 in the UE group 51 is configured to report an address of a selected port of the UE 511 to the cellular network access device 52, and the cellular network access device 52 is further configured to send the received address of the selected port to one or more other UEs 511 in the UE group 51 except the UE 511. The UE 511 is further configured to receive short range wireless communications network address information and cellular network identity information of the one or more other UEs 511 that are reported by the one or more other UEs 511 according to the address of the selected port. Preferably, a routing table is saved in the UE 511, and the routing table includes the one or more other UEs 511 in the UE group 51 except the UE 511.

In this embodiment, a routing manner of the short range wireless communications network is a centralized routing manner.

In addition, when the routing manner of the short range wireless communications network is a distributed routing manner, the UE 511 is further configured to separately send short range wireless communications network address information and cellular network identity information of each UE 511 in the UE group 51 to the one or more other UEs 511. Preferably, a routing table is saved in each UE 511 in the UE group 51, and the routing table includes short range wireless communications network address information and cellular network identity information of one or more other UEs 511 in the UE group 51.

Figure 8:
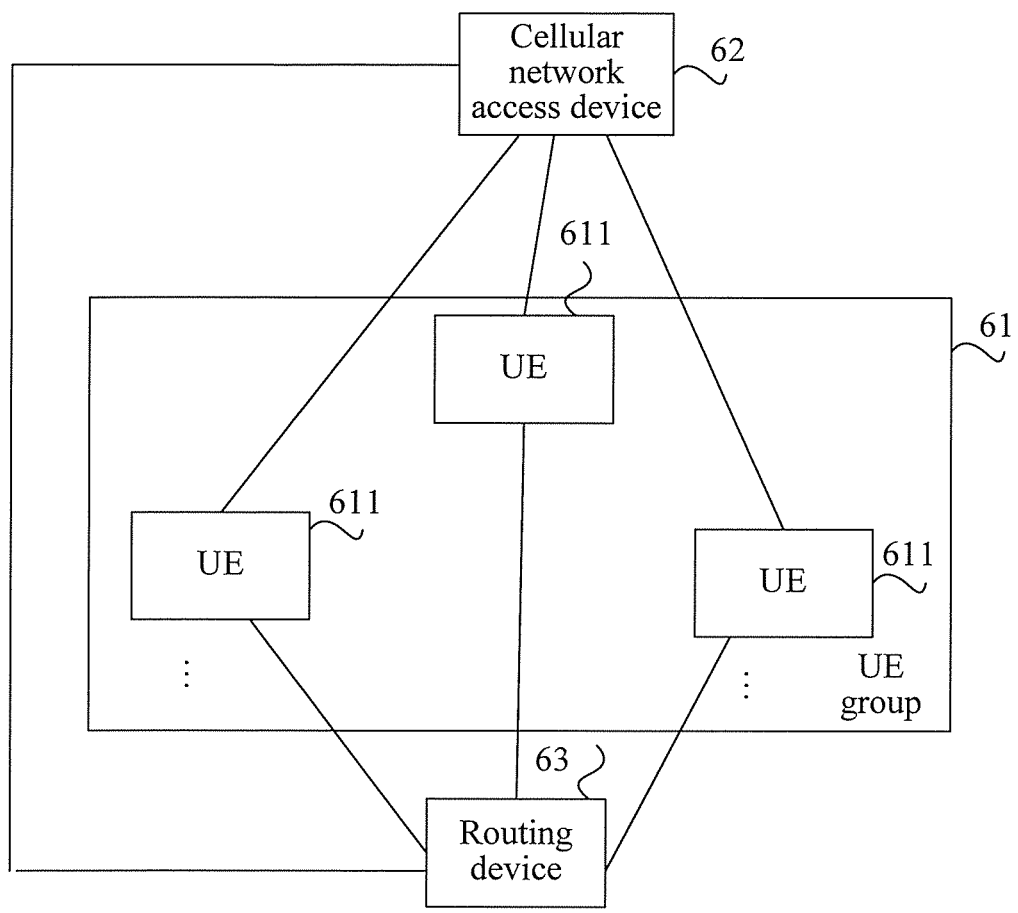
FIG. 8 is a schematic structural diagram of another embodiment of a communications system according to the present invention.

FIG. 8 is a schematic structural diagram of another embodiment of a communications system according to the present invention. As shown in FIG. 8, the communications system in this embodiment includes: a UE group 61, a cellular network access device 62, and a routing device 63, where the UE group 61 includes multiple UEs 611. Each UE 611 is connected to the cellular network access device 62; and is configured to: obtain short range wireless communications network address information and a group identifier of the UE 611 after joining the same short range wireless communications network, and report group communication capability information and the group identifier of the UE 611 to the cellular network access device 62. The cellular network access device 62 is separately connected to each UE 611; and is configured to: allocate cellular network identity information to each UE 611, and receive the group communication capability information and the group identifier of each UE 611. The routing device 63 is configured to obtain the short range wireless communications network address information and the cellular network identity information of each UE 611 in the UE group 61.

In this embodiment, each UE 611 in the UE group 61 joins the same short range wireless communications network, and a routing manner of the short range wireless communications network is a centralized routing manner. A group communication capability of each UE 611 refers to a capability using which the UE 611 can form the UE group 61 with one or more other UEs 611, and can forward data to or receive data from the cellular network access device by using a UE 611 in the UE group 61. The group identifier of each UE 611 may be identity information of a server in the short range wireless communications network, for example, identity information of a beacon device of the UE group 61 or identity information of a routing device of the UE group 61.

Preferably, the cellular network access device 62 may specifically be a base station or the like. It should be noted that the base station herein may be a base station in a broad sense, for example, an RNC in a 3G network, or an evolved base station in a 4G network, or a base station controller in a 2G network. For all the UEs 611, a connection between the UEs 611 may be established in a specific wireless communications manner (for example, WiFi or Bluetooth). The short range wireless communications network address information is MAC address information or IP address information. The cellular network identity information may include an RNTI, or a logical channel identifier, or an RNTI and a logical channel identifier, or inner-group identity information allocated for group communication, or inner-group identity information and a logical channel identifier.

In this embodiment, the routing device 63 obtains the short range wireless communications network address information and the cellular network identity information of each UE 611 in the UE group 61. Therefore, for example, when the cellular network access device 62 needs to send data to a UE 611 in the UE group 61, the cellular network access device 62 may directly send the data to the UE 611, and may also send the data to another UE 611 in the UE group 61, and then the another UE 611 forwards the data to the routing device 63, so that the routing device 63 forwards the data to the UE 611. Especially when an environment of the UE 611 deteriorates, and the UE 611 cannot directly receive the data sent by the cellular network access device 62, another UE 611 in the UE group 61 may be used to forward the data to the UE 611.

In this embodiment, a UE group, a cellular network access device, and a routing device are provided, multiple UEs in the UE group are all made to join the same short range wireless communications network, and each UE is connected to the cellular network access device, so that each UE separately obtains cellular network identity information allocated by the cellular network access device, and then reports group communication capability information and a group identifier of the UE to the cellular network access device, so that the cellular network access device receives the group communication capability information and the group identifier of each UE; and finally, the routing device obtains short range wireless communications network address information and the cellular network identity information of each UE in the UE group. This implements interaction between the UEs, and improves a throughput and/or reliability of data transmission of the UE.

Further, in still another embodiment of the communications system of the present invention, based on the foregoing embodiment shown in FIG. 8, the cellular network access device 62 is further configured to select one UE 611 from the UE group 61 as a beacon device, send a notification message to the beacon device, and send obtained detection information of the beacon device, or detection information and connection information that are of the beacon device to one or more other UEs 611 in the UE group 61 except the beacon device.

The one or more other UEs 611 in the UE group 61 except the beacon device are configured to establish a connection to the beacon device according to the detection information of the beacon device, or the detection information and the connection information, so that each UE joins the same short range wireless communications network.

Still further, in yet another embodiment of the communications system of the present invention, based on the foregoing embodiment shown in FIG. 8, the cellular network access device 62 is further configured to use one UE 611 in the UE group 61 as a beacon device according to a received notification message sent by the one UE 611, and send obtained detection information of the beacon device, or detection information and connection information that are of the beacon device to one or more other UEs 611 in the UE group 61 except the beacon device.

The one or more other UEs 611 in the UE group 61 except the beacon device are configured to establish a connection to the beacon device according to the detection information of the beacon device, or the detection information and the connection information, so that each UE 611 joins the same short range wireless communications network.

Figure 9:
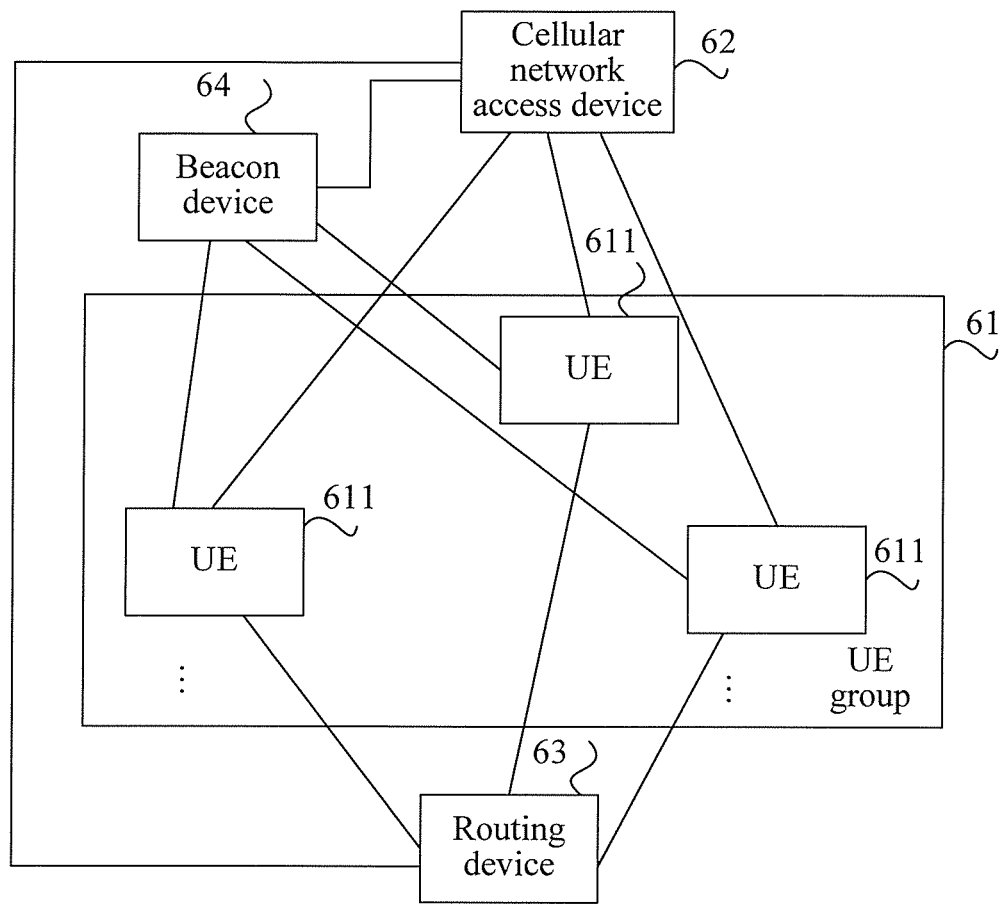
FIG. 9 is a schematic structural diagram of still another embodiment of a communications system according to the present invention.

Still further, FIG. 9 is a schematic structural diagram of still another embodiment of a communications system according to the present invention. Based on the foregoing embodiment shown in FIG. 8, as shown in FIG. 9, the communications system further includes: a beacon device 64. The cellular network access device 62 is further configured to: obtain detection information of the beacon device 64, or detection information and connection information that are of the beacon device 64, and send the detection information of the beacon device 64, or the detection information and the connection information to the UEs 611 in the UE group 61. Each of the UEs 611 in the UE group 61 is further configured to establish a connection to the beacon device 64 according to the detection information of the beacon device 64, or the detection information and the connection information, so that each UE 611 joins the same short range wireless communications network.

Still further, in yet another embodiment of the communications system of the present invention, based on the foregoing embodiment shown in FIG. 8, the cellular network access device 62 is further configured to obtain detection information of the beacon device 64, or detection information and connection information that are of the beacon device 64, and send the detection information of the beacon device 64, or the detection information and the connection information to the UEs 611 in the UE group 61. Each of the UEs 611 in the UE group 61 is further configured to establish a connection to the routing device according to the detection information of the beacon device 64, or the detection information and the connection information, so that each UE 611 joins the same short range wireless communications network.

In addition, it should be noted that in any one of the foregoing embodiments, the UE may specifically be a smartphone, that is, basically the UE can support both a short range communications technology (such as WiFi or BlueTooth) and a cellular communications technology (such as LTE, 3G UMTS or CDMA, 2G GSM, or WiMAX). An example is used in which the cellular communications technology is SAE/LTE, and the short range communications technology is WiFi. In a scenario of a single network node and cooperative communication performed between multiple users, or referred to as a scenario of multiple UEs cooperative communication (multiple UEs cooperative communication, MUCC for short), when at least two UEs have a feature of supporting both WiFi and LTE, to improve reliability and a throughput, an MUCC relationship may be established between the at least two UEs, that is, when one UE of the at least two UEs needs to send or receive data, one or more other UEs except the one UE may provide support to assist the one UE in communication. In the present invention, the one UE is named a benefited UE, a served UE, or an assisted UE, and the one or more other UEs except the one UE are named a supporting UE, a serving UE, or an assisting UE. The foregoing naming of the UEs is merely an example given in the present invention, and naming of the UEs in the present invention includes, but is not limited to, the foregoing example of naming.

The supporting UE and the benefited UE are used as an example. The benefited UE is a final sender of uplink data or a final receiver of downlink data (from the perspective of a cellular network), and for a bearer, generally there is only one benefited UE. The supporting UE is a UE used to assist the benefited UE in data relay, and for a bearer of the benefited UE, there may be multiple supporting UEs.

The supporting UE and the benefited UE are used as an example. Concepts of the benefited UE and the supporting UE are viewed from the perspective of a bearer of the benefited UE. For example, a UE1 and a UE2 form MUCC, and they may assist each other in communication. In this way, from the perspective of a bearer of the UE1, the UE2 may support the bearer of the UE1; therefore, the UE1 is the benefited UE, and the UE2 is the supporting UE. At the same time, the UE1 may also support a bearer of the UE2; therefore, from the perspective of the bearer of the UE2, the UE2 is the benefited UE, and the UE1 is the supporting UE.

The supporting UE and the benefited UE are used as an example. When the foregoing UEs are within the same short range connection area, a network may separately send downlink data to the supporting UE and the benefited UE (one optimized method is that a UE having a best radio link condition is always selected for data sending during network scheduling). When the network sends the downlink data to the supporting UE, the supporting UE that receives the data sends the data to the benefited UE by means of short range communications (for example, WiFi). Certainly, the data may also directly reach the benefited UE, and the benefited UE merges the data. Similarly, uplink data of the benefited UE may also be sent to the network by the benefited UE itself or by another supporting UE, and then the network merges the data to complete cooperative communication between the UEs.

Transmission assisted by the supporting UE can improve reliability and a throughput of communication of the benefited UE.

Finally, it should be noted that: the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A communication method, comprising:
   sending, by a first user equipment (UE), a notification message to a cellular network access device for indicating that the first UE requests to be a beacon device;
   receiving, by the first UE from the cellular network access device, a message indicating that the first UE is the beacon device;
   sending, by the first UE, a detection signal for indicating that the first UE is the beacon device;
   receiving, by a second UE, detection information of the first UE from the cellular network access device;
   detecting, by the second UE, the detection signal according to the detection information for connecting the second UE to the first UE;
   connecting the first UE to the second UE via a short range wireless communications network;
   forwarding, by the first UE, data between the cellular network access device and the second UE when the second UE cannot directly receive data sent by the cellular network access device;
   obtaining, by the first UE, cellular network identity information of the second UE and address information of the second UE in the short range wireless communications network, wherein the address information of the second UE comprises an identifier in the short range wireless communication network; and
   wherein forwarding, by the first UE, data between the cellular network access device and the second UE comprises:
      forwarding, by the first UE according to the cellular network identity information of the second UE and the address information of the second UE, the data between the cellular network access device and the second UE.

2. The method according to claim 1, wherein the detection information comprises at least one of following: an identifier of the beacon device, a transmit frequency of the beacon device and a pilot frequency of the beacon device.

3. A communication method, comprising:
   receiving, by a cellular network access device, a notification message from a first user equipment (UE) for indicating that the first UE requests to be a beacon device;
   sending, by the cellular network access device to the first UE, a message indicating that the first UE is the beacon device;
   obtaining, by the cellular network access device, detection information of the first UE;
   sending, by the cellular network access device, the detection information to at least one second UE for detecting a detection signal sent from the first UE for indicating that the first UE is the beacon device and for connecting the first UE to the second UE;
   sending, by the cellular network access device, data to the first UE for forwarding between the cellular network access device and the second UE when the second UE cannot directly receive data from the cellular network access device; and wherein the data sent to the first UE for forwarding between the cellular network access device and the second UE is forwarded according to cellular network identity information of the second UE and address information obtained by the first UE of the second UE in the short range wireless communications network, wherein the address information of the second UE comprises an identifier in the short range wireless communication network.

4. The method according to claim 3, further comprising: receiving, by the cellular network access device through the first UE, data from the second UE.

5. The method according to claim 3, wherein the detection information comprises at least one of following: an identifier of the beacon device, a transmit frequency of the beacon device and a pilot frequency of the beacon device.

6. A user equipment (UE), comprising:
a transceiver;
a processor coupled with the transceiver;
wherein the processor is configured to:
    cause the transceiver to send a notification message to a cellular network access device for indicating that the UE requests to be a beacon device, and
    cause the transceiver to send a detection signal for indicating that the UE is the beacon device;
wherein the transceiver is configured to:
    receive, from the cellular network access device, a message indicating that the UE is the beacon device;
wherein another UE receives detection information of the UE from the cellular network access device, and detects the detection signal according to the detection information for enabling the other UE to establish a connection to the UE;
wherein the processor is further configured to:
    control the transceiver to connect the UE with the other UE via a short range wireless communications network,
    forward data between the cellular network access device and the other UE when the other UE cannot directly receive data from the cellular network access device,
    obtain cellular network identity information of the other UE and address information of the other UE in the short range wireless communications network, wherein the address information of the other UE comprises an identifier in the short range wireless communication network, and
    forward data received from the cellular network access device to the other UE according to the cellular network identity information of the second UE and the address information of the other UE.

7. The UE according to claim 6, wherein the detection information comprises at least one of following: an identifier of the beacon device, a transmit frequency of the beacon device and a pilot frequency of the beacon device.

8. A cellular network access device, comprising:
a transceiver;
a processor coupled with the transceiver;
wherein the transceiver is configured to:
    receive a notification message from a first user equipment (UE for indicating that the first UE requests to be a beacon device;
wherein the processor is configured to:
    cause the transceiver to send, to the first UE, a message indicating that the first UE is the beacon device,
    obtain detection information of the beacon device,
    cause the transceiver to send the detection information to at least one second UE for detecting a detection signal sent from the first UE for indicating that the first UE is the beacon device and for connecting the first UE to the second UE, and
    cause the transceiver to send data to the first UE for forwarding between the cellular network access device and the second UE when the second UE cannot directly receive data from the cellular network access device; and
wherein the data sent to the first UE for forwarding between the cellular network access device and the second UE is forwarded according to cellular network identity information of the second UE and address information obtained by the first UE of the second UE in the short range wireless communications network, wherein the address information of the second UE comprises an identifier in the short range wireless communication network.

9. The cellular network access device according to claim 8, wherein the transceiver is further configured to:
receive, through the first UE, data from the second UE.

10. The cellular network access device according to claim 8, wherein the detection information comprises at least one of following: an identifier of the beacon device, a transmit frequency of the beacon device and a pilot frequency of the beacon device.

* * * * *